No. 614,012. Patented Nov. 8, 1898.
C. KOENIG.
PRIMARY BATTERY.
(Application filed Feb. 16, 1898.)
(No Model.)
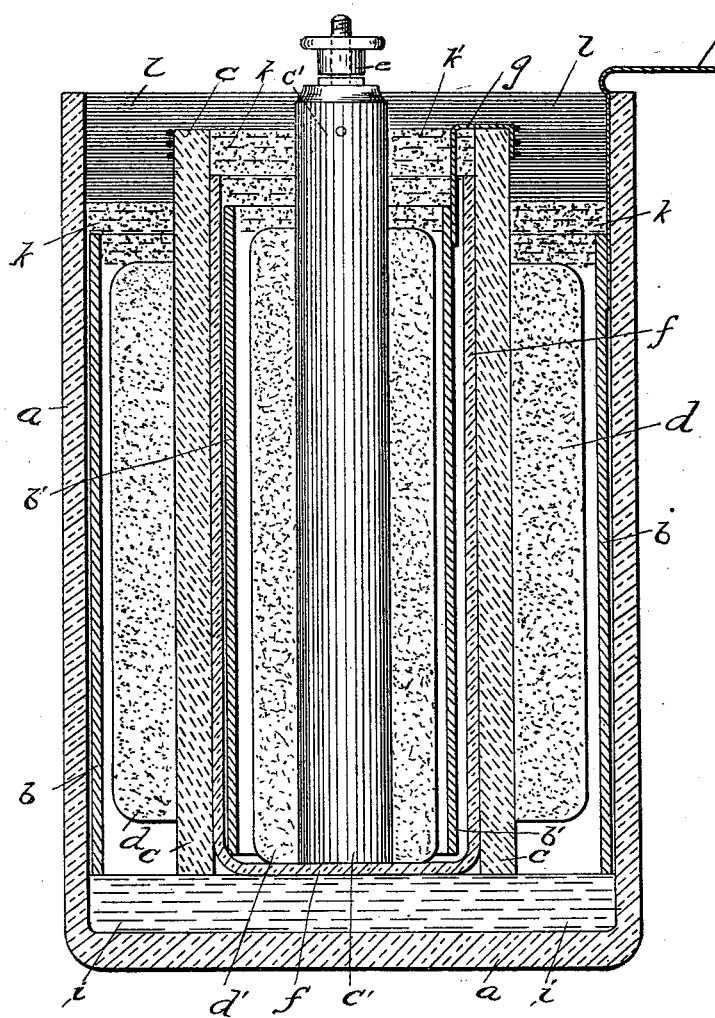
Attest
Walter Donaldson
L. B. Middleton
Inventor
Carl Koenig
by Richards
Attys.

UNITED STATES PATENT OFFICE.

CARL KOENIG, OF BERLIN, GERMANY.

PRIMARY BATTERY.

SPECIFICATION forming part of Letters Patent No. 614,012, dated November 8, 1898.

Application filed February 16, 1898. Serial No. 670,493. (No model.)

*To all whom it may concern:*

Be it known that I, CARL KOENIG, residing at Berlin, Germany, have invented Improvements in Primary Batteries, of which the following is a specification.

This invention relates to primary batteries, and it is equally applicable to batteries in which the exciting medium is dry or fluid.

The object of the present invention is to provide an arrangement of permanent cell so that a doubling, trebling, or increasing of the number of volts to be produced is simply arranged for without a corresponding increase in the space occupied by the primary battery.

The invention generally consists in arranging the alternate elements of the battery in a concentric cylindrical form, divided between each pair by a concentric insulated pot of glass or the like, and so arranging the number of these elements to produce the required voltage and coupling them up by conducting-strips in series or parallel as required.

The accompanying drawing illustrates in vertical section a primary battery embodying the present invention, and it is constructed and operates as follows:

The glass-containing vessel $a$ carries within it immediately adjacent to its well a zinc cylinder $b$, and concentric with this zinc cylinder and nearer the center of the vessel is a carbon cylinder $c$. The space between the cylinders $b$ and $c$ is filled, or nearly filled, up with exciting-paste in order to avoid as far as possible the rapid polarization which takes place when a liquid excitant is used. This exciting-paste is preferably made of a layer of bioxid of manganese and graphite $d$, applied to the surface of the carbon cylinder $c$. Within the carbon cylinder $c$ and adjacent thereto is a second glass pot or vessel $f$, having a zinc cylinder $b'$ within and immediately adjacent to it, and in the center of this vessel a carbon rod $c'$ is placed. This carbon $c'$ is again surrounded with a layer of paste $d'$ of a similar composition to that hereinbefore described, and it also carries at its upper extremity the main terminal $e$. The coupling together of the elements one to the other is effected by strips of lead $g$, joining $b'$ and $c$ and brought into good conducting connection therewith by a wrapping of wire or the like. The outer terminal, which, when connected with $e$, completes the circuit, is also formed by a strip $h$, preferably soldered to the zinc cylinder $b$.

The bottom of the outer containing vessel $a$ is filled up, as shown, by a layer of sawdust, upon which all the inner elements and smaller containing-pot rest, while similar layers of sawdust $k$ $k'$ close the upper portion of the inner containing-pot $c$ and the annulus between that and the outer containing-pot $a$. Finally, a layer of pitch $l$, to completely insulate and hold all the elements in position, is placed, as shown, over the sawdust, and this layer of pitch only allows the terminals $e$ and $h$ to jut out ready for connection when it is desired to complete the electric circuit and allow a current to flow.

It is to be understood that though this construction is specially applicable to what are known as "dry" batteries, still a liquid excitant may be used with the same alternate concentric arrangement of elements and without departing from the subject of the present invention.

Having now particularly described and ascertained the nature of my said invention and in what manner the same is to be performed, I declare that what I claim is—

1. In primary batteries the provision of two or more pairs of alternate concentric elements with insulating-pots between each pair and suitable exciting-paste between each set of elements, all as a means for obtaining a fairly-constant high-voltage current from a cell of small size substantially as described.

2. A primary battery consisting of two glass jars $a, f$, one within the other, a zinc cylinder $b$ and the carbon cylinder $c$ within the outer jar and between it and the inner jar, the exciting-paste between the zinc and carbon cylinders $b, c$, a zinc cylinder $b'$ within the inner glass jar, a carbon rod arranged centrally of the inner glass jar, and the exciting-paste between the inner zinc cylinder $b'$ and the central carbon rod, the said inner zinc cylinder $b'$ and the first carbon cylinder $c$ being electrically connected.

In witness whereof I have hereunto set my hand in presence of two witnesses.

CARL KOENIG.

Witnesses:
CHARLES H. DAY,
HENRY HASPER.